United States Patent

Taylor

[11] Patent Number: 5,134,882
[45] Date of Patent: Aug. 4, 1992

[54] FIBER-OPTIC ACCELEROMETER

[75] Inventor: Robert M. Taylor, Cheltenham, England

[73] Assignee: Smiths Industries Public Limited Company, London, England

[21] Appl. No.: 584,691

[22] Filed: Sep. 19, 1990

[30] Foreign Application Priority Data

Sep. 21, 1989 [GB] United Kingdom ............... 8921370

[51] Int. Cl.⁵ ............................................. G01P 15/08
[52] U.S. Cl. .................................. 73/517 R; 73/653; 250/227.17
[58] Field of Search ............. 73/517 R, 516 LM, 653, 73/655, 657; 250/227.17

[56] References Cited

U.S. PATENT DOCUMENTS

| | | | |
|---|---|---|---|
| 4,442,350 | 4/1984 | Rashleigh | 73/657 |
| 4,516,021 | 5/1985 | Taylor | 250/227.17 |
| 4,534,222 | 8/1985 | Finch et al. | 73/653 |
| 4,613,752 | 9/1986 | Davis | 73/516 LM |
| 4,799,752 | 1/1989 | Carome | 73/655 |
| 4,829,821 | 5/1989 | Carome | 73/517 R |

Primary Examiner—John E. Chapman
Attorney, Agent, or Firm—Pollock, Vande Sande and Priddy

[57] ABSTRACT

An accelerometer includes a compliant cylinder supported midway along its length and having equal masses at opposite ends. Two birefringent optical fibers with elliptical cores are wound around the cylinder in opposite senses on opposite sides of the support. Radiation from a source is supplied to one end of both fibers and emerges from the opposite end where it is supplied to respective photodiodes via respective polarizers. Acceleration axially of the cylinder causes extensive strain in one fiber and compressive strain in the other which causes equal and opposite changes in birefringence. A processor subtracts the change in outputs of the photodiodes to provide an acceleration output that is independent of temperature.

7 Claims, 1 Drawing Sheet

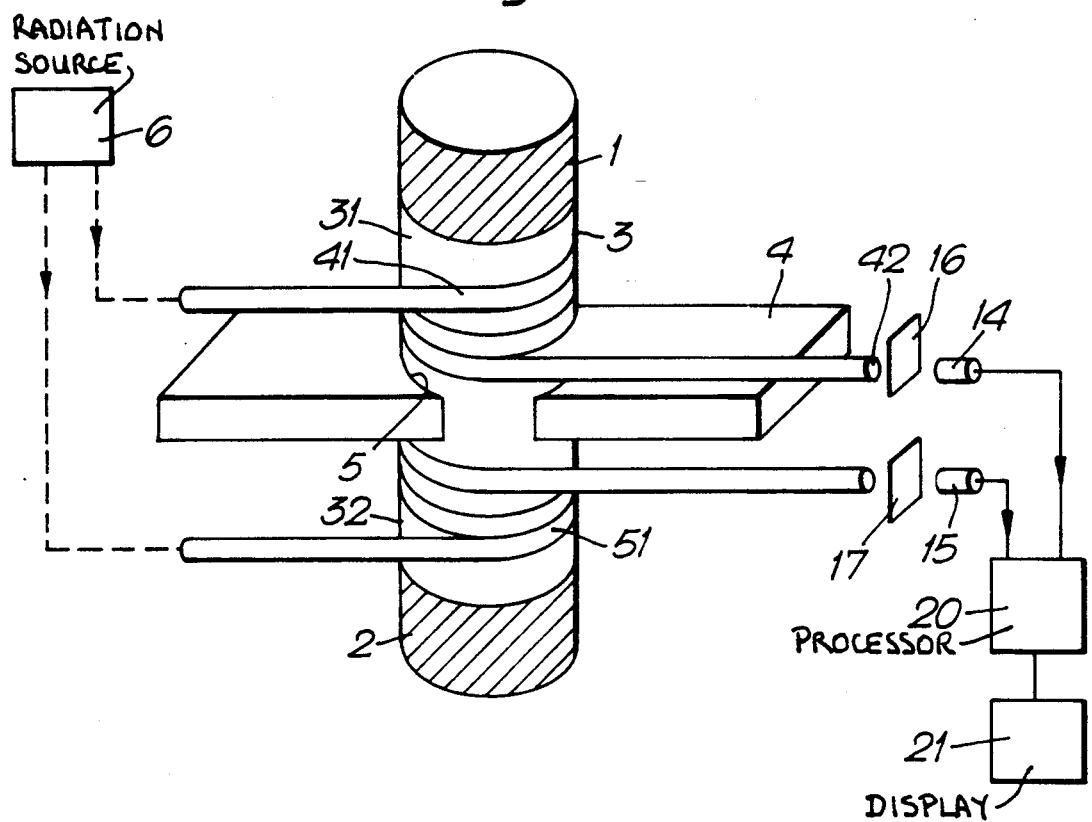
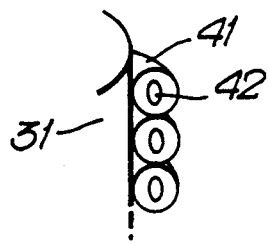

FIBER-OPTIC ACCELEROMETER

BACKGROUND OF THE INVENTION

This invention relates to accelerometers.

The invention is more particularly concerned with accelerometers for providing an optical output.

It is an object of the present invention to provide an accelerometer that can provide an optical output which is independent of the effects of temperature change.

According to the present invention there is provided an accelerometer including first and second compliant members having respective axes arranged parallel with one another, a support that supports the compliant members at a first end, a first mass mounted at the second end of the first compliant member, a second mass identical with the first mass mounted at the second end of the second compliant member opposite the first mass, first and second optical fibers exhibiting birefringence wound around respective ones of the compliant members such that acceleration axially of the compliant members compresses one of the compliant members and extends the other compliant member so as to produce equal and opposite changes in birefringence in the first and second optical fibers, and means responsive to the change in birefringence of both fibers that is arranged to produce an output representative of acceleration which is independent of temperature.

The first and second compliant members are preferably arranged axially of one another with the first end of the compliant members adjacent one another. The first and second compliant members are preferably provided by opposite ends of a compliant cylinder supported midway along its length. The cylinder may be of circular section. The compliant members may be of an elastomeric material. The first and second optical fibers preferably both have a core of elliptical section, the major axis of the elliptical section of each fiber extending parallel to the axis of the compliant members.

The accelerometer may include a source of radiation that is arranged to supply radiation to one end of both optical fibers, a first detector arranged to receive radiation from the opposite end of the first optical fiber and, a second detector arranged to receive radiation from the opposite end of the second optical fiber. The accelerometer may include a first polarizer located between the opposite end of the first optical fiber and the first detector, and a second polarizer located between the opposite end of the second optical fiber and the second detector, the first and second polarizers being arranged such that a maximum level of radiation is incident on the detectors for a minimum applied acceleration. The accelerometer preferably includes processor means connected with the first and second detectors, the processor means being arranged to determine for each fiber, the change in values of birefringence cause by applied acceleration and to subtract these values from one another.

An accelerometer according to the present invention will now be described, by way of example, with reference to the accompanying drawings.

BRIEF DESCRIPTION OF THE DRAWINGS

FIG. 1 is a perspective, schematic view of the accelerometer; and

FIG. 2 is a partly cut-away view of a part of the accelerometer to a larger scale.

DESCRIPTION OF THE PREFERRED EMBODIMENTS

The accelerometer includes two, identical masses 1 and 2 mounted at opposite ends of a solid, circular section cylinder 3 of a compliant, resilient material such as an elastomeric rubber or plastics. The cylinder 3 is supported by a rigidly fixed plate or support 4 with a central aperture 5 that embraces the cylinder 3 around its circumference, midway along its length. In this way, the cylinder is effectively divided into two members 31 and 3 of equal length which are axially aligned with one another.

Around the upper member 31 is closely wound a length of a highly birefringent fiber 41 having a core 42 of elliptical section. In the drawings, for simplicity, there are only shown three windings of the fiber 41 although, in practice, many more windings would be used. The fiber 41 is wound such that, in section, the major axis of a cross section through the elliptical core 42 extends parallel to the axis of the cylinder 3 and such that the major axis of each winding of the fiber align with one another (FIG. 2). An identical fiber 51 is wound in opposite sense around the lower compliant member 32.

One end of both fibers 41 and 51 extends to a source 6 of optical radiation. The other end of both fibers 41 and 51 extends to a respective detector, such as a photodiode 14 and 15, via respective polarizers 16 and 17. The polarizers 16 and 17 are oriented relative to the core of the fiber 41 and 51 such that they give a maximum transmission to the photodiodes 14 and 15 when there is a zero or minimum acceleration applied to the accelerometer. The electrical output from each photodiode 14 and 15 is supplied to a processing unit 20 which provides an output signal, representative of acceleration, to a display or other utilization device 21.

Alternatively, the two fibers 41 and 51 could be multiplexed using a single source and detector by means of modulation/demodulation elements.

In use, acceleration with a downward component along the axis of the cylinder 3 will compress the upper member 31 and extend the lower member 32. This thereby results in an increase in the diameter of the upper member 31 and a decrease in diameter of the lower member 32. The two fibers 41 and 51 both consequently experience axial strain as a result of the changes in circumference of the upper and lower portions of cylinder 3. The axial strain in the two fibers 41 and 51 will, however, be of opposite kinds; the strain in the upper fiber is extensive, whereas that in the lower fiber is compressive. The winding of the fibers 41 and 5 is such that the orientation of the fibers, internal optical axes ensures that the externally induced birefringence, caused by axial stresses on the fibers, enhances the fibers internal birefringence. Any stresses in the fibers 41 and 51 would alter the relative intensities of radiation polarized along different, orthogonal axes where the radiation emerges from the ends of the fibers. This consequently causes a change in the intensity of radiation passed by the polarizers 16 and 17 and hence a change in the radiation incident on the detectors 14 and 15. The effect of acceleration on the outputs of the detectors 14 and 15 will be of equal magnitude but complementary, that is, the output of one detector 14 will increase by an amount equal to that by which the output of the other detector 15 decreases. The effect of a change in temperature will, however, be an identical change in the outputs of the two detectors 14 and 15.

The processing unit 20 provides a reading for both detectors 14 and 15 in accordance with changes in their outputs from the zero acceleration state. In order to compensate for any change in temperature, the processing unit 20 subtracts these two readings from one another before deriving the output to the display 21.

The sensitivity of the accelerometer to acceleration is dependent on several factors such as the nature of the compliant cylinder, the size of the mass and so on. The accelerometer can therefore, be modified for different requirements by change in its mechanical components.

It will be appreciated that it is not essential to use a single compliant cylinder 3 but that the two portions 31 and 32 could be separate compliant members with parallel axes and preferably arranged axially of each other.

What I claim is:

1. An accelerometer comprising: a first compliant member having a first and second end; a second compliant member having a first and second end, said first and second compliant members being provided by opposite ends of a compliant cylinder and having respective axes aligned with one another; a support supporting said cylinder midway along its length thereby to support the compliant members at their said first ends; a first mass mounted at said second end of said first compliant member; a second mass identical with said first mass mounted at said second end of said second compliant member opposite said first mass; a first optical fiber exhibiting birefringence and being wound around said first compliant member; a second optical fiber exhibiting birefringence and being wound around said second compliant member such that acceleration axially of the compliant members compresses one of the compliant members and extends the other compliant member so as to produce equal and opposite changes in birefringence in the first and second optical fibers; and a processor responsive to the change in birefringence of both said fibers, the processor producing an output representative of acceleration which is independent of temperature.

2. An accelerometer according to claim 1, wherein the cylinder is of circular section.

3. An accelerometer according to claim 1, wherein the compliant members are of an elastomeric material.

4. An accelerometer according to claim 1, wherein said first and second optical fibers both have a core of elliptical section, and wherein the major axis of the elliptical section of each fiber extends parallel to the axis of the compliant members.

5. An accelerometer according to claim 1, including a source of radiation, said source of radiation supplying radiation to one end of both the optical fibers, a first detector receiving radiation from an opposite end of said first optical fiber, and a second detector receiving radiation from an opposite end of said second optical fiber.

6. An accelerometer according to claim 5, wherein the processor determines for each said fiber, the change in values of birefringence caused by applied acceleration and subtracts these values from one another.

7. An accelerometer comprising: a first compliant member having a first and second end; a second compliant member having a first and second end, said first and second compliant members having respective axes aligned parallel with one another, a support supporting the compliant members at said first ends, a first mass mounted at said second end of said first compliant member, a second mass identical with said first mass mounted at said second end of said second compliant member opposite said first mass, a first optical fiber exhibiting birefringence and being wound around said first compliant member, a second optical fiber exhibiting birefringence and being wound around said second compliant member such that acceleration axially of the compliant members compresses one of the compliant members and extends the other compliant member so as to produce equal and opposite changes in birefringence in the first and second optical fibers, a source of radiation which supplies radiation to one end of both the optical fibers, a first detector receiving radiation from an opposite end of said first optical fiber, a second detector receiving radiation from an opposite end of said second optical fiber, a first polarizer located between said opposite end of said first optical fiber and said first detector, a second polarizer located between said opposite end of said second optical fiber and said second detector, said first and second polarizers being so oriented that a maximum level of radiation is incident on the detectors for a minimum applied acceleration, and a processor responsive to the change in birefringence of both said fibers, the processor producing an output representative of acceleration which is independent of temperature.

* * * * *